United States Patent [19]

Yuyama

[11] Patent Number: 4,903,861

[45] Date of Patent: Feb. 27, 1990

[54] MEDICINE FEEDER

[76] Inventor: Shoji Yuyama, 3-8, Honan-cho Nishi 4-chome, Toyonaka-shi, Osaka, Japan

[21] Appl. No.: 291,785

[22] Filed: Dec. 29, 1988

[30] Foreign Application Priority Data

Aug. 8, 1988 [JP] Japan .................... 63-104805

[51] Int. Cl.⁴ .............................. B65H 3/00
[52] U.S. Cl. ..................... 221/265; 222/367
[58] Field of Search ............ 221/265, 263, 277, 258, 221/203, 202, 82, 76, 182; 222/370, 367

[56] References Cited

U.S. PATENT DOCUMENTS 2,620,091 12/1952 Thompson ............... 221/263 X
3,102,662 9/1963 Crabtree ................. 222/370 X
3,172,565 3/1965 Ashworth ............... 221/277 X Primary Examiner—Joseph J. Rolla
Assistant Examiner—David H. Bollinger
Attorney, Agent, or Firm—Wenderoth, Lind & Ponack

[57] ABSTRACT

A feeder or dispenser for feeding tablets, capsules or the like. A rotor is mounted in a container or feeder body. The capsules put into the container are guided into channels formed at outer edge of the rotor at angular spacings and then into pockets formed nearer to the center of rotation than the channels. The capsules are discharged from the pockets one by one each time the pockets are aligned with a feed opening provided in the bottom plate of the container as the rotor rotates.

1 Claim, 2 Drawing Sheets

MEDICINE FEEDER

BACKGROUND OF THE INVENTION

The present invention relates to a device for continuously feeding medicine in the form of tablets or capsules one by one into a wrapping device.

In Japanese Utility Model Publication No. 60-34620, a medicine feeder is disclosed which comprises a container provided with a feed cylinder at its bottom and a pillar-shaped rotor rotatably mounted in the feed cylinder. The rotor has a peripheral flange formed with a plurality of cutouts. Capsules or tablets are guided into the cutouts and discharged from a feed opening formed in the bottom plate of the feed cylinder one by one as the rotor rotates. With the prior art medicine feeder, since the cutouts are formed at the peripheral portion of the rotor where its peripheral speed is the highest, each cutout passes over the feed opening in an instant. Thus the capsule in each cutout is often trapped in between the cutout and the feed opening or fails to be discharged into the feed opening.

SUMMARY OF THE INVENTION

It is an object of the present invention to provide a medicine feeder which obviates the abovesaid shortcomings and which can reliably feed capsules or tablets one by one to a feed opening formed in the bottom plate of a container.

When the rotor is turned in one direction with capsules filled in the container, the capsules will move along the tapered top surface of the rotor toward its peripheral edge and drop into the feed channels and then into the pockets continuous with the channels. With the rotation of the rotor, the pockets will be brought into alignment with the feed opening one after another so as to reliably discharge the capsules in the pockets from the feed opening one by one.

The capsules in the container can be smoothly guided down along the conically tapered top surface of the rotor toward its peripheral edge. Since the bottom plate also has its top surface tapered and the feed channels have wide openings, the capsules can smoothly drop into the feed channels without the fear of getting stuck at any of the openings of the channels. Thus, the medicine feeder according to the present invention can discharge all the capsules in the container without fail.

Other features and objects of the present invention will become apparent from the following description taken with reference to the accompanying drawings, in which:

DETAILED DESCRIPTION OF THE PREFERRED EMBODIMENT

Figure 1:
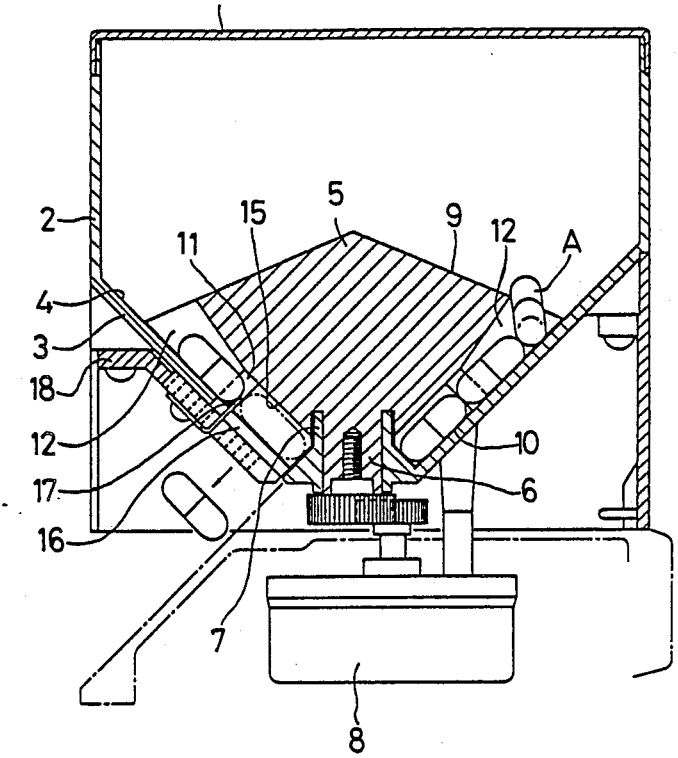
FIG. 1 is a vertical sectional front view of the medicine feeder embodying the present invention.

As shown in FIG. 1, the medicine feeder according to the present invention comprises a lid 1 and a container 2 including a funnel-shaped bottom plate 3 having its top surface 4 tapered downwardly toward its center.

Figure 2:
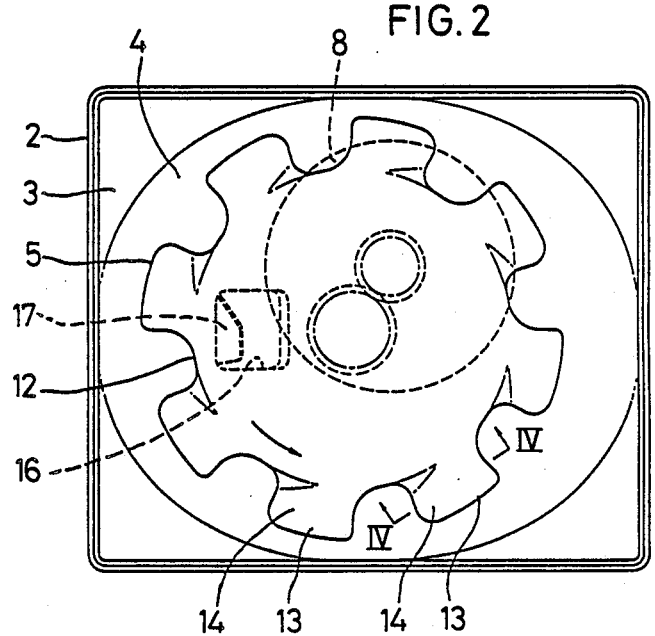
FIG. 2 is a plan view of the same with the lid removed.

A rotor 5 is mounted in the container 2 on the bottom plate 3. The rotor 5 has a bottom shaft 6 rotatably received in a cylindrical portion 7 provided in the center of the bottom plate 3 so as to be rotated in the direction of arrow of FIG. 2 by means of a motor 8.

The rotor 5 has its top surface 9 tapered conically downwardly from its center to guide the capsules on the tapered surface 9 toward its peripheral edge and has its bottom surface 10 tapered in a juxtaposed relationship to the tapered surface 4 of the bottom plate 3. The bottom surface 10 is formed with an annular groove 11 extending through its intermediate portion.

The tapered surface 10 is further formed outside of the annular groove 11 with a plurality of radially extending medicine feed channels 12 at equal angular intervals. The channels 12 should have such a shape that their width will gradually increase outwardly so as to allow the capsules on the tapered surface 9 to drop easily into the channels 12 from their large top opening. For this purpose, rib portions 13 formed between the channels 12 should have their top surface 14 sloping downwardly toward the channel 12 at the rear side of each rib with respect to the direction of rotation of the rotor.

The medicine feed channels 12 may be in any other shape than a groove shape. For example, the bottom surface 10 of the rotor 5 may be shaped so that a plurality of conical spaces for feeding the capsules will be defined between the bottom surface 10 and the top surface 4 of the bottom plate 3.

Figure 3:
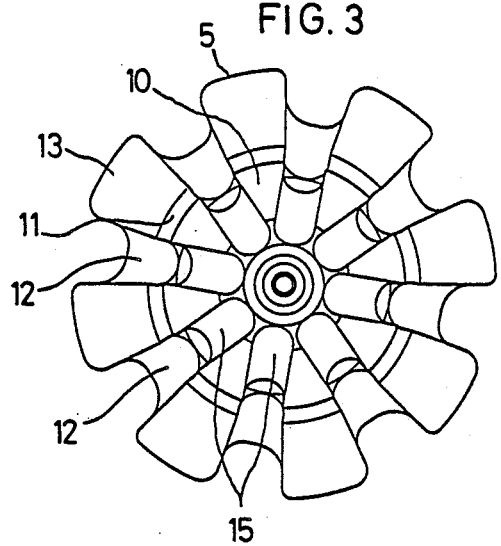
FIG. 3 is a bottom view of the rotor of the same.
Figure 4:
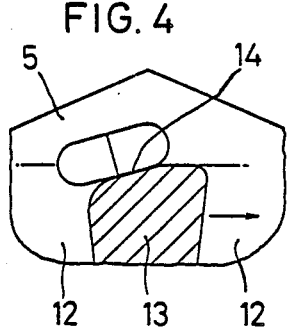
FIG. 4 is a sectional view taken along line IV—IV of FIG. 2.

The tapered surface 10 of the rotor 5 is formed inwardly of the annular groove 11 with a plurality of pockets 15 each having a size large enough to accommodate one capsule of medicine. (FIG. 3) Each pocket 15 is aligned with and in communication with the respective medicine feed channel 12. The bottom plate 3 of the container 2 is formed with a feed opening 16 in such a position as to get into alignment with the pockets 15 one after another when the rotor 5 is rotated.

Over the feed opening 16, there is provided a thin tongue plate 17 secured to a base 18 supporting the container 2 by means of screws and having its top projecting into the annular groove 11 formed in the bottom surface 10 of the rotor 5. This tongue plate 17 is adapted to cover the top of the pocket 15 brought into alignment with the feed opening 16 with the rotation of the rotor 5, thus preventing more than one capsules from being discharged through the feed opening 16 at one time.

In operation, medicine in the form of capsules or the like are put in the container 2. The motor 8 is activated to rotate the rotor 5 in the direction of arrow in FIG. 2. With the rotation of the rotor 5, the capsules will move toward the peripheral edge of the tapered surface 4 of the bottom plate 3 and drop into the feed channels 12 and then into the pockets 15. The pockets each containing one capsule will be brought into alignment with the feed opening 16 one after another as the rotor 5 rotates, so that the capsules will be discharged through the feed opening 16 one by one.

Since the pockets 15 are provided near the center of rotation of the rotor, they move at such a slow speed as to allow the capsules A in each pocket to be discharged from the feed opening 16 one by one without fail.

What is claimed is:

1. A medicine feeder for feeding capsules of medicine or the like, comprising:
 a container having a funnel-shaped bottom plate tapered toward the center thereof;

a rotor rotatably mounted in said container on said bottom plate and having a conical top surface tapered toward its peripheral edge;

said rotor having formed in its peripheral edge a plurality of medicine feed channels angularly spaced from one another and having a bottom surface tapered so as to be complementary with said funnel-shaped bottom plate of said container, said bottom surface of said rotor being formed with a plurality of pockets angularly spaced from one another, said pockets being in communication with said medicine feed channels;

said bottom plate of said container being formed with a feed opening with which said pockets are brought into alignment one after another when said rotor rotates, thereby discharging the capsules in said pocket out of the medicine feeder one by one; and a tongue member provided to cover the pocket in alignment with said feed opening to prevent more than one capsule from being discharged out of said pocket at a time.

* * * * *